United States Patent [19]

Bischoff et al.

[11] Patent Number: 5,742,916

[45] Date of Patent: Apr. 21, 1998

[54] PROCESS AND CIRCUIT FOR CONTROLLING THE CONTROL UNIT OF A SYSTEM FOR PROTECTING VEHICLE OCCUPANTS

[75] Inventors: Michael Bischoff, Karlstein; Johann Guggenberger, Mintraching; Oskar Leirich, Neutraubling, all of Germany

[73] Assignee: Siemens Aktiengesellschaft, Munich, Germany

[21] Appl. No.: 784,477

[22] Filed: Jan. 17, 1997

Related U.S. Application Data

[63] Continuation of Ser. No. 494,054, filed as PCT/EP93/03672, Dec. 23, 1993, published as WO94/14638, Jul. 7, 1994, abandoned.

[30] Foreign Application Priority Data

Dec. 23, 1992 [EP] European Pat. Off. .............. 92121842
Sep. 23, 1993 [EP] European Pat. Off. .............. 93115391

[51] Int. Cl.$^6$ .......................... B60R 21/32; B60R 22/46
[52] U.S. Cl. .................... 701/45; 180/271; 280/734
[58] Field of Search ..................... 364/424.05, 424.055; 307/10.1, 10.6, 10.7; 180/232, 271, 282; 280/728 R, 734, 735; 340/436, 438

[56] References Cited

U.S. PATENT DOCUMENTS

| | | | |
|---|---|---|---|
| 3,762,495 | 10/1973 | Usui et al. | 180/103 |
| 4,346,913 | 8/1982 | Schrauf et al. | 280/735 |
| 4,638,179 | 1/1987 | Mattes et al. | 280/735 |
| 4,994,972 | 2/1991 | Diller | 364/424.05 |
| 5,014,810 | 5/1991 | Mattes et al. | 180/268 |
| 5,040,118 | 8/1991 | Diller | 364/424.05 |
| 5,068,793 | 11/1991 | Condne et al. | 364/424.05 |
| 5,262,949 | 11/1993 | Okano et al. | 364/424.05 |
| 5,343,411 | 8/1994 | Olsson | 364/566 |
| 5,424,583 | 6/1995 | Spiess | 307/10.1 |
| 5,430,649 | 7/1995 | Cashler et al. | 364/424.05 |
| 5,446,661 | 8/1995 | Gioutsos et al. | 364/424.05 |
| 5,493,493 | 2/1996 | Shibata et al. | 364/424.05 |

FOREIGN PATENT DOCUMENTS

| | | |
|---|---|---|
| 0 292 669 | 11/1988 | European Pat. Off. . |
| 0 327 853 | 8/1989 | European Pat. Off. . |
| 0 458 796 | 11/1992 | European Pat. Off. . |
| 0 511 556 | 11/1992 | European Pat. Off. . |
| 41 17 811 C2 | 12/1992 | Germany . |
| 41 17 811 | 6/1993 | Germany . |
| 90/09298 | 8/1990 | WIPO . |
| 90/11207 | 10/1990 | WIPO . |
| 94/14638 | 7/1994 | WIPO . |

Primary Examiner—Michael Zanelli
Attorney, Agent, or Firm—Herbert L. Lerner; Laurence A. Greenberg

[57] ABSTRACT

A process and a circuit control a control unit of a system for protecting vehicle occupants, with a view toward triggering the protection system if the accident is sufficiently serious. The control unit contains one or more sensors which supply sensor signals during the accident, and it contains a computing unit. During the accident, the latter establishes one ACTUAL value or a plurality of different ACTUAL values characterizing the course of the accident on the basis of the sensor signals. It also automatically and continuously redefines a time-variable triggering threshold value in each case, which is namely directly or indirectly dependent on the changes in the sensor signals during the course of the accident. The computing unit compares one or more ACTUAL values with the triggering threshold value being respectively assigned to the ACTUAL value. However, on the basis of the progression of the ACTUAL value/ACTUAL values, it defines the triggering threshold value at any instant in such a way that it changes in a fluctuating manner at least during an accident phase, namely without delay in dependence on the instantaneous value of the ACTUAL value/ACTUAL values, even if during this accident phase there occur constantly major decelerations without the collision direction altering.

25 Claims, 3 Drawing Sheets

$$\frac{K_1 \cdot \frac{I_1}{R_1} + K_2 \cdot \frac{I_2}{R_2} + \ldots + K_{n-1} \cdot \frac{I_{n-1}}{R_{n-1}} + K_n \cdot \frac{I_n}{R_n}}{\sum_{m=1}^{n} K_m} \geq 1$$

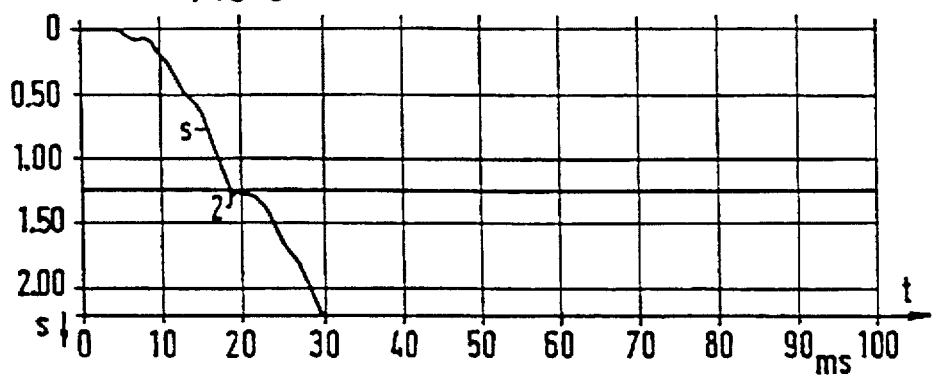
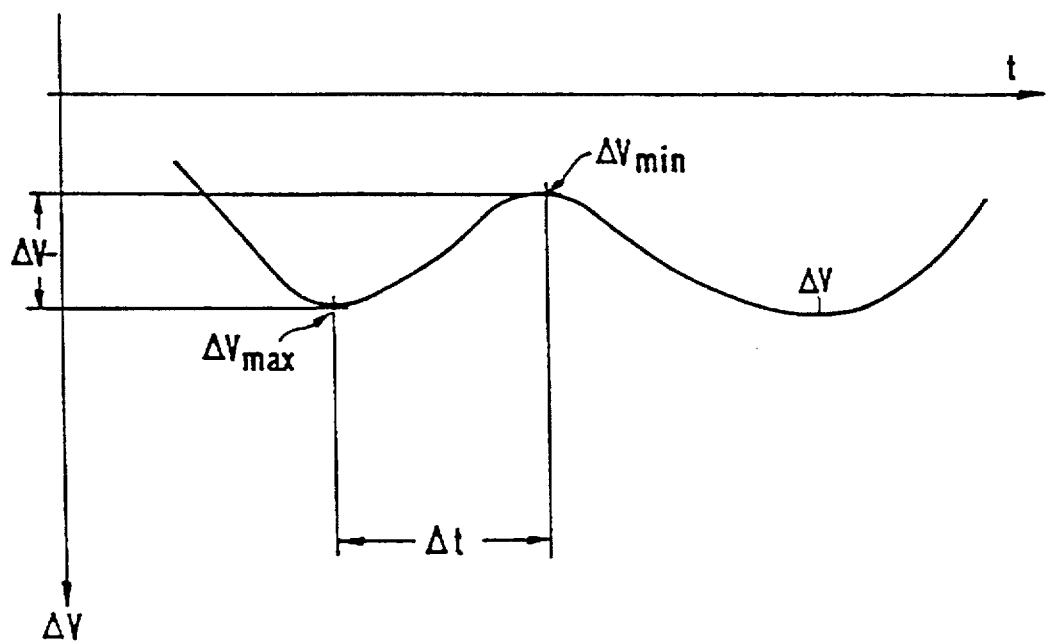

PROCESS AND CIRCUIT FOR CONTROLLING THE CONTROL UNIT OF A SYSTEM FOR PROTECTING VEHICLE OCCUPANTS

CROSS-REFERENCE TO RELATED APPLICATION

This application is a continuation of application Ser. No. 08/494,054, filed on Jun. 23, 1995 now abandoned which is a Continuation of International Application Ser. No. PCT/EP93/03672, filed Dec. 23, 1993 published as WO94/14638, Jul. 7, 1994.

BACKGROUND OF THE INVENTION

Field of the Invention

The invention relates to a process and a circuit for controlling a control unit which uses an algorithm to trigger a system, such as an air bag system, for protecting occupants of a vehicle, in the event of a sufficiently serious accident. However, the system may also be a system with belt pretensioning devices and/or roll bars, for example.

The invention was in fact initially conceived as a further development of the control unit described in International Patent Application WO 90/11207.

However, it became evident that it can additionally be used for other configurations as well.

The following combination of features is known per se from European Patent 0 458 796 B1, corresponding to International Patent Application WO 90/09298, in which an unusually large number of examples is described:
a process for controlling the control unit of a system for protecting vehicle occupants with a view to triggering the protection system if the accident is sufficiently serious, in which the control unit contains one or more sensors, which supply sensor signals during the accident,
the control unit contains a computing unit
* which, during the accident, establishes on the basis of the sensor signals one ACTUAL value or a plurality of different ACTUAL values characterizing the course of the accident,
  for example the ACTUAL value corresponding to the deceleration, and/or the ACTUAL value of the travel/time corresponding to the loss in speed,
* which automatically and continuously redefines in each case a time-variable triggering threshold value, which is dependent directly or indirectly on the changes in the sensor signals during the course of the accident,
* and which carries out comparisons between one or more ACTUAL values and the triggering threshold value respectively assigned to the ACTUAL value.

It concerns a process for controlling a system for protecting vehicle occupants, having a crash sensor which supplies a deceleration signal, in the event of an accident. During the accident, in each case a computing unit carries out at least integrations and comparisons from a starting time, namely a time integration of the deceleration signal, as a result of which, during the accident, a loss in speed thus far, characterizing the evolvement of the accident, is determined approximately as an ACTUAL value. It also carries out comparisons of this ACTUAL value with such a time-variable triggering threshold value, which for its part is constantly redefined by the computing unit, directly or indirectly, in dependence on the current fluctuations in the progression of the deceleration signal and consequently in dependence on ACTUAL values being determined by this computing unit, at least during part of the course of the accident. Incidentally, in that document, the crash-dependent loss in speed being determined in each case is divided first of all by the total duration thus far of the evolvement of the accident, in order to determine ACTUAL average values of the decelerations thus far with the computing unit.

It is evident from maxima and minima shown in FIG. 5 of that document that the ACTUAL deceleration average value is compared with a time-variable, but only very sluggishly variable, triggering threshold value. According to the description of that figure, the triggering threshold value is lowered gradually from a high value to a low value in short time steps one after the other, for example, depending on the computer cycle, that is virtually without delay and consequently quasi-continuously.

In the case of the example described in FIG. 8 of that document, a temporary raising of the triggering threshold value is intended, although with the triggering threshold value not following the respective ACTUAL deceleration average value immediately, but, according to the associated description, in particular under the control of a timing element.

In FIGS. 10 and 11 of WO 90/09298 and according to the associated description, an example is described in which the aim is in fact a delayless abrupt lowering, being defined by the computing unit on the basis of the ACTUAL deceleration average value being determined, but only a time-delayed re-raising of the triggering threshold value to a then always equally high starting level, as compared with one another. The triggering threshold value thus varies there between a constantly identical maximum value and low intermediate values, which are then, however, maintained for a predetermined time duration and are consequently fixed.

In the case of those known examples, the triggering threshold value thus does not fluctuate continuously and sensitively in accordance with the sensor signals, up and down about any values in principle, at least during lengthy accident phases. This can be seen from FIG. 7 of the instant application, which shows, according to the invention, that it is not only the ACTUAL values determined from a signal from a deceleration sensor (solid curve, in this case for ACTUAL losses in speed) which exhibit a plurality of maxima and minima in a rapidly fluctuating way. In the case of this example according to the invention, the triggering threshold value (dashed curve) fluctuates similarly rapidly to the determined ACTUAL value, up and down by greater and smaller amounts, sensitively apportioned and individually adapted to the evolvement of the accident.

There are, furthermore, a whole series of further documents which likewise correspond to the combination of features that is known per se from European Patent 0 458 796 B1, corresponding to International Patent Application WO 90/09298, as described above, such as, for example:

International Patent Application WO 90/11207,

U.S. Pat. No. 3,762,495,

U.S. Pat. No. 4,994,972,

U.S. Pat. No. 5,044,118 and

European Application 0 292 669 A1.

These documents respectively concern processes for a control unit which triggers a system for protecting occupants of a vehicle if a crash is sufficiently serious, with the control unit containing a computing unit which can generate a control signal for triggering the protection system according to an algorithm that is composed of sub-algorithms and processes output signals of one or more sensors. In the event of a crash, the sensors allow the computing unit to determine ACTUAL values, exhibiting finite amounts, as values being determined by the sensor signals and having different physical units. The algorithm simultaneously evaluates a plurality of ACTUAL values which are distributed over the sub-algorithms and for their part trigger the protection system only whenever they lie within triggering value ranges which are for their part defined by triggering threshold values being directly assigned to those ACTUAL values, so that those directly assigned triggering threshold values also have the different physical units.

In the case of those processes which are known from the five further documents cited above, there are thus a plurality of ACTUAL values having different physical dimensions assigned to a plurality of triggering threshold values and a plurality of sub-algorithms. The various ACTUAL values can also be measured directly themselves by a plurality of special sensors. However, it is revealed particularly by the drawings of those known documents that in each case they use one or more algorithms which are composed of sub-algorithms and themselves compare ACTUAL values with assigned fixed triggering threshold values, with the comparison results being YES/NO results, that are subsequently also combined in accordance with Boolean rules.

The basic concept of those algorithms as well can be approximately described as follows, such as in FIG. 1 of the instant application: all of the sub-algorithms in each case compare a single ACTUAL value Ix of the different ACTUAL values I1 ... Iz in each case with one or more triggering threshold values Ax assigned to them. As soon as, for example, the sub-algorithm I1/A1 containing the ACTUAL value I1 is itself greater than ONE and/or I1/A2 is less than ONE, they respectively generate, for example, a logical ONE as the result, and otherwise a logical ZERO. Those ONEs and ZEROs are combined according to Boolean rules and thus, for example, by AND elements, as a result of which it is established, for example, whether the relevant ACTUAL value I1 lies inside or outside the triggering value range W. However, triggering is carried out, for example, only within the range W. It is only as soon as a certain combination, being defined by Boolean logic, of the ZERO/ONE results of the sub-algorithms exists, in other words only as soon as all of the various ACTUAL values Ix taken into consideration lie within the triggering value ranges W assigned to them with fixed triggering threshold values Ax, that those algorithms then respectively supply a final result for controlling the protection system. If, accordingly, even only a single one of those ACTUAL values I1 does not yet reach its triggering threshold value A1 even if only by a little, the protection system is not triggered, even if the other ACTUAL values I2 ... Iz are already well within their triggering value ranges W2 ... Wz and consequently themselves comfortably satisfy the prerequisite for triggering.

The process known from German Patent DE 41 17 811 C2 also has similarities, in particular, with the process defined in the combination of features known per se from European Patent 0 458 796 B1, corresponding to International Patent Application WO 90/09298, as described above. In that case, the decelerations measured by the crash sensor are sent, on one hand, directly through the first input of a subtraction element, and on the other hand, delayed by a certain amount, through the second input of that subtraction element, to the input of an integrator, in order to determine the "partial" ACTUAL loss in speed. There is in fact no distinction made there by separate threshold values for angles of different sizes for an oblique collision. However, a distinction is made between a frontal collision and an oblique collision by triggering threshold values of different levels. According to FIG. 3 thereof, for that purpose two subtraction elements may be provided, responding to different decelerations, and two integrators in order to assign two different triggering threshold values to the two different ACTUAL values for partial ACTUAL losses in speed, one for a frontal collision and one for an oblique collision.

According to FIGS. 3 and 6 thereof and according to the associated description, in particular column 2, line 63 to column 3, line 4; column 5, lines 17 to 56; and column 4, lines 6 to 10 and 41 to 68, the severity of the collision in at least one of the two collision directions is additionally taken into consideration, in that the computing unit additionally switches the particular triggering threshold value assigned to this direction to another fixed value with a "threshold value switch", depending in particular on the steepness with which the relevant acceleration changes.

In the case of many known algorithms, at least in the case of sub-algorithms thereof, there is already a differentiation between different types of accidents, in particular with regard to the collision direction. For example, depending on the collision direction, a different sub-algorithm applies, such as in International Patent Application WO 90/11207.

In examples described therein, sensor signals/ACTUAL values are compared by sub-algorithms with assigned triggering threshold values, which yields YES/NO results or ONE/ZERO results. Through the use of a Boolean operation, it is finally decided which sub-algorithm is to be effective, in that only that upper or lower triggering threshold value assigned to it and only that ACTUAL value which is directly assigned to that triggering threshold value and is assigned to the relevant collision direction, ultimately influence the control of the triggering. It is not stated therein that the relevant triggering threshold values themselves fluctuate over time.

For example, in European Application 0 292 669 A1, there is in fact a differentiation with regard to the different progressions of the ACTUAL values within the same collision direction. A maximum speed limit A2 is fixed therein, above which the triggering is blocked, that is to say not carried out, such as in FIG. 1 of the instant application, and a minimum speed limit A1, below which the triggering is likewise blocked, that is to say not carried out. However, within the same collision direction the relevant ACTUAL value is compared only with the upper limit A2 being fixed in itself, for example the maximum speed limit A2, and/or with the minimum limit A1 being fixed in itself, for example the minimum speed A1. The ACTUAL values are thus assigned there to fixed, constant triggering threshold values A1, A2.

However, from the point of view of the invention, that represents a no longer acceptable disadvantage, because the triggering is delayed too much and is often even incorrectly prevented entirely. The optimum triggering time may then have long since past when the ACTUAL value I1 finally is the last to reach its triggering threshold value A1.

It is known from European Application 0 327 853 A1 for a computing unit to use a double integration of the deceleration signal to calculate the crash-dependent forward propulsion of the vehicle occupants, in dependence on boundary conditions such as on the respective position and the inherent resilience of the seat of the occupant, in dependence on whether or not that occupant is supported against the steering wheel and whether or not he or she is restrained by a seat belt, and in dependence on the time expended until the protection system comes into effect, with the aim also being to obtain a direction characteristic of the threshold value with a second crash sensor, that is oriented in the transverse direction with respect to the vehicle axis. That process also determines in particular the optimum firing time for the triggering. The triggering threshold value itself is in each case constant over time, even if it depends on those boundary conditions such as restraint by the belt.

SUMMARY OF THE INVENTION

It is accordingly an object of the invention to provide a process and a circuit for controlling the control unit of a system for protecting vehicle occupants, which overcome the hereinafore-mentioned disadvantages of the heretofore-known processes and devices of this general type and which adapt a triggering threshold value individually to a relevant evolvement of an accident, in each case in an immediately and particularly well apportioned manner, with little expenditure for hardware.

With the foregoing and other objects in view there is provided, in accordance with the invention, in a process for controlling a control unit of a vehicle-occupant protection system by triggering the protection system if an accident is sufficiently serious, the control unit including at least one sensor supplying sensor signals during the accident, and a computing unit establishing one ACTUAL value or a plurality of different ACTUAL values characterizing a course of the accident on the basis of the sensor signals, during the accident, for example the ACTUAL value corresponding to a deceleration and/or the ACTUAL value of a travel/time corresponding to a loss in speed, for automatically and continuously redefining a time-variable triggering threshold value in each case, being directly or indirectly dependent on changes in the sensor signals during the course of the accident, and carrying out comparisons between the at least one ACTUAL value and the triggering threshold value being respectively assigned to the at least one ACTUAL value, and the process comprising defining the triggering threshold value at any instant with the computing unit on the basis of the progression of the at least one ACTUAL value, for changing the triggering threshold value in a fluctuating manner at least during an accident phase without delay, in dependence on an instantaneous value of the at least one ACTUAL value, even if constantly major decelerations occur during the accident phase with a collision direction remaining the same.

In the case of the invention, the triggering threshold value generally fluctuates particularly rapidly, dependent on ACTUAL values. In particular, there are two variants for the invention, which are discussed below, with it also being possible for the two variants to be used in combination with each other.

Typical of the invention and consequently also of its two variants is that their triggering threshold values which are applicable at any instant, at least within certain phases in the course of a crash, can constantly fluctuate rapidly up and down, generally by small amounts. The invention thus defines time-variable triggering threshold values in order to be able to differentiate in a particularly sensitively adapted way between different collision situations, even for one and the same collision direction. The triggering threshold value is, for example, dependent on the progression thus far of the measured decelerations, i.e. on the ACTUAL values of the decelerations. The triggering threshold values which are applicable at any instant even fluctuate constantly up and down if during the relevant course of the crash ONLY CONSIDERABLE decelerations occur! The invention allows the algorithm also to be configured, for example, in such a way that the protection system triggers at the correct time even if the vehicle makes impact at the front with a greater or lesser degree of lateral offset, depending on vehicle type and point of collision with its most yielding body parts or else with its most rigid body parts, against a low block. In this case, the invention even requires particularly little expenditure on hardware.

The invention is not restricted to processes in which the computing unit determines only a single specific ACTUAL value having a specific physical-mathematical dimension, for example the ACTUAL loss in speed or the ACTUAL deceleration average value. Thus, in the control unit operated according to the invention, a plurality of determined ACTUAL values having different physical-mathematical dimensions may also be used.

The invention is not primarily concerned at all so much with the fact that it uses different triggering threshold values for different collision directions. Such differences are indeed also very useful in the case of the algorithms according to the invention, and are often intended, as will be shown later. Instead of this, the invention in particular already differentiates with regard to the different possible progressions of the ACTUAL values within one and the same collision direction, in that for this it assigns fluctuating triggering threshold values to the relevant ACTUAL values being determined.

In the case of the invention, the algorithm can indeed likewise combine one or more results of the sub-algorithms in accordance with Boolean rules. However, in the case of the invention at least one of the triggering threshold values, and in the case of the second variant of the invention at least two triggering threshold values, is/are no longer established definitively by a fixed value, but by a variable triggering threshold value.

The invention allows a great multiplicity of algorithms to be used according to the invention, as is shown below in detail. By virtue of this variety, the algorithm can be adapted optimally to that requirement which emerges from crash tests of the vehicle type which is respectively concerned.

In accordance with another mode of the invention, there is provided a process which comprises supplying a deceleration signal from the at least one sensor in the form of a crash sensor in the event of an accident; performing at least one time integration of the deceleration signal, for example for determining an ACTUAL loss in speed, from a starting time with the computing unit during the accident, for determining the at least one ACTUAL value; and comparing the ACTUAL value determined through the integration with the defined instantaneous triggering threshold value in the computing unit.

These steps allow the first variant of the invention to be offered in such a way that it requires particularly little expenditure on hardware and makes it possible to differentiate particularly sensitively between different collision situations, even for one and the same collision direction, and to be precise even if the vehicle makes impact at the front with a greater or lesser degree of lateral offset, depending on vehicle type and point of collision with its most yielding body parts or else with its most rigid body parts, against a low block.

In accordance with a further mode of the invention, there is provided a process which comprises performing a time integration of the deceleration signal with the computing unit over a short time duration in comparison with the duration of the deceleration signal, for example for only 5 msec. and beginning the time duration in advanced accident phases after the starting time, making the short time duration shorter than the duration of the accident thus far, for continually determining a current partial loss in speed being related to the short time duration by approximation, as the determined current value, during the accident.

In this way, through the use of particularly intensive consideration of the loss in speed occurring particularly during the last short time duration, it is possible to be able to go into particular circumstances of an accident occurring during this short time duration in a particularly well apportioned manner, which is particularly favorable, for example, in the case of a multiple collision in rapid succession, for example into a number of solid slats of a fence one after the other.

In accordance with an added mode of the invention, there is provided a process which comprises performing a time integration of the deceleration signal exclusively or additionally over the entire duration thus far as the integration with the computing unit, commencing from the starting time, for continually determining a total current loss in speed occurring since the starting time by approximation during the accident.

It is thus possible, by consideration of the total ACTUAL loss in speed occurring thus far during the entire duration of an accident, to also be able to take mechanical-physical properties of the obstacle, for example its weight and/or relative speed into consideration.

In accordance with an additional mode of the invention, there is provided a process which comprises defining the current triggering threshold value with the computing unit by a division of a currently determined, partial or total loss in speed through a time duration and consequently by determination of the current deceleration average value, with the triggering threshold value depending on the amount of the current deceleration average value, and the triggering threshold value becoming smaller or greater with a rising or falling amount of the current deceleration average value.

This makes it possible to also be able to take the duration thus far of the evolvement of an accident into consideration, in that deceleration values occurring only in late phases of this accident then only have comparatively little influence on the continuous fluctuations of the triggering threshold value to be defined, while deceleration values which occur at the beginning of the vibrations measured by the sensor very rapidly produce an extremely high triggering threshold value, so that the triggering of the protection system is reliably avoidable in cases of short severe impacts, for example due to potholes or edges of curb stones.

In accordance with yet another mode of the invention, there is provided a process which comprises also making the current triggering threshold value dependent on at least one stored past value amount having been determined by the computing unit during previous phases of the accident.

This step is performed in order to also take into consideration those marked fluctuations of the deceleration signal which occurred in already elapsed phases of this accident and consequently represent, for example, phenomena typical of the specific vehicle type concerned, for the collision from a particular direction and/or for the collision with yielding obstacles or obstacles of very high mass.

In accordance with yet a further mode of the invention, there is provided a process which comprises using amounts having been previously determined as then current values, at least by approximation, as the past values, for those times at which at least one of the last minimum and the maximum preceding the last minimum, of the progression thus far of the determined at least partial loss in speed occurred in each case.

This is done in order to use those past values which are particularly characteristic for distinguishing either those obstacles which are initially hard, but then quite yielding, such as, for example, not very thick, breaking-off small trees or fences or relatively yielding parts of an opposing vehicle, such as, for example, its trunk, or in particular also those obstacles which are collided with obliquely, on one hand, and either those obstacles which are less yielding, or in particular also obstacles which are collided with frontally, on the other hand.

In accordance with yet an added mode of the invention, there is provided a process which comprises using the difference between the amounts of the determined losses in speed during the last minimum and during the maximum preceding the last minimum, at least by approximation, as the past value, with the current triggering threshold value becoming greater or smaller with a rising or a falling difference.

This step makes it possible to use the relevant past value for the apportioned raising or lowering of the triggering threshold value.

In accordance with yet an additional mode of the invention, there is provided a process which comprises also dividing the difference by the amount of the loss in speed having been determined, at least by approximation, for the relevant maximum or minimum.

These method steps permit an even better-optimized apportioning of the raising/lowering of the triggering threshold value, with these relative amounts of the relevant differences likewise allowing conclusions to be drawn as to the collision direction and other typical accident features such as collision with posts or laterally offset collisions, depending on the vehicle type concerned.

In accordance with again another mode of the invention, there is provided a process which comprises also dividing the difference, at least by approximation, by the amount of a time period between the relevant minimum and maximum.

Through the use of these relative value determinations, it is possible to indirectly take the ACTUAL vehicle speed in particular, into consideration.

In accordance with again a further mode of the invention, there is provided a process which comprises not, or no longer, influencing the triggering threshold value by the difference between the amounts of the other past values between a minimum lying before the last minimum and a maximum preceding it.

Thus, in particular, in the case of a multiple collision following in rapid succession, for example in the case of a collision with small trees or fence parts that are close to one another, or in the case of a collision by relatively yielding parts of the vehicle in question, it is possible to use only the last of these collisions in each case as co-determining for the following definition of the triggering threshold value.

In accordance with again an added mode of the invention, there is provided a process which comprises also making the current triggering threshold value dependent on at least one stored past value amount having been determined by the computing unit during previous phases of the accident, and mathematically defining and making the triggering threshold value dependent on at least a first component depending on the amount of the current deceleration average value, and a second component depending on stored amounts of the past values.

Through the use of these steps, it is possible to use a simple algorithm, which can be handled rapidly by the computing unit.

In accordance with again an additional mode of the invention, there is provided a process which comprises respectively representing the two components by an element of a mathematical difference, in which the first component forms a subtrahend and contains a possibly weighted amount of the current deceleration average value, for instance multiplied by a first constant/weighting factor, and the second component forms a minuend and contains a possibly weighted difference between the amounts of the relevant past values, for instance multiplied by a second constant/weighting factor.

Through the use of the weighting, it is possible to permit an optimum adaptation of the triggering threshold value progression to the respective vehicle type in a particularly simple way.

In accordance with still another mode of the invention, there is provided a process which comprises setting the current triggering threshold value at a constant value at predetermined times.

This makes it possible to fix limit values for the triggering threshold value, adaptably to the vehicle type concerned, in such a way that the triggering is appropriately controlled even under extreme circumstances.

In accordance with still a further mode of the invention, there is provided a process which comprises evaluating/determining at least two ACTUAL values having different physical units, from the sensor signals, according to an algorithm being composed of sub-algorithms, with the computing unit, for evaluating the ACTUAL values in the sub-algorithms and triggering the protection system only whenever the ACTUAL values lie within triggering value ranges, for likewise giving the assigned triggering threshold values the different physical units, and in order to differentiate the accidents not, or not only, with regard to the collision direction but with regard to the different progressions of the ACTUAL values within the same collision direction, at least a sub-algorithm of the algorithm treats at least two of the triggering threshold values, assigned directly to different ACTUAL values, as guide values being variable themselves in jumps or continuously, by the algorithm assigning the guide value being directly assigned to the one ACTUAL value in each case indirectly and also to at least one further ACTUAL value having a different physical dimension, with the further ACTUAL value being assigned directly to another guide value, and the algorithm defining a currently valid amount of the triggering threshold value from case to case each on the basis of the indirectly assigned ACTUAL values and on the basis of the directly assigned ACTUAL value.

These steps are performed in order to offer a second variant of the invention, which also only requires little expenditure on hardware and makes it possible to differentiate particularly sensitively between different collision situations, even for one and the same collision direction. This variant in particular allows triggering of the protection system at the correct time even if one or some ACTUAL values have not yet quite reached their directly assigned guide value, when, however, other ACTUAL values have long since reached their directly assigned guide value and consequently have long since arrived in their triggering value ranges.

In accordance with still an added mode of the invention, there is provided a process which comprises treating at least individual values of the variable triggering threshold values with at least one of the sub-algorithms of the algorithm, for enabling the values to correspond in themselves to at least three values in each case, namely in each case to a central guide value bounding a central triggering value range, and at least one further inner and[one further outer triggering threshold value above and below the central guide value in each case, for respectively defining three types of triggering value ranges with the variable triggering threshold values, namely an inner triggering value range no longer including the central guide value, a central triggering value range being adjacent the relevant central guide value, and an outer triggering value range inside which the central guide value lies.

This is done in order to achieve a finely graduated weighting of the variable threshold values, as a result of which the algorithm can be adapted very well even in the case of extreme crash conditions that nevertheless still differ considerably from one another.

In accordance with still an additional mode of the invention, there is provided a process which comprises making at least one of the sub-algorithms of the algorithm correspond mathematically to a linear aggregate of ACTUAL value-dependent aggregate elements, and including comparisons of the ACTUAL value with the directly assigned central guide value in at least two of the aggregate elements in each case.

Through the use of these steps of the method, it is possible to achieve even a continuous variation of the relevant triggering threshold values in a particularly simple and rapid way, so that the computing time necessary for triggering is particularly short and the very limited time in the case of a crash is utilized particularly well. The margins within which the individual variable triggering threshold values can change can then be individually fixed themselves as desired by a corresponding choice of the weighting factors for each aggregate element/for each limit value.

In accordance with another mode of the invention, there is provided a process which comprises including a weighting factor fixing the intensity of the variation of the relevant triggering threshold value, in at least one of the aggregate elements.

This step is performed in order to fix the intensity of the variation of the individual triggering threshold values as desired, according to requirements.

In accordance with a further mode of the invention, there is provided a process which comprises including products of different ACTUAL values, in the algorithm.

It is accordingly possible to use a further sub-variant for continuous changing of the triggering threshold values.

In accordance with an added mode of the invention, there is provided a process which comprises additionally supplying YES/NO criteria to the computing unit from the at least one sensor, and additionally processing the YES/NO criteria with the algorithm.

Thus, it is possible to additionally take YES/NO criteria into consideration in the algorithm, that is, for example, to take into consideration whether passenger seats are occupied or not, in order to trigger the protection system fitted specifically for these seats only whenever a passenger is actually sitting there, or whether the occupant to be protected has put on a safety belt or not, because a person restrained by a belt requires the protection system only in the case of a more serious crash than does a person not restrained by a belt.

With the objects of the invention in view, there is also provided a circuit configuration having a computing unit for carrying out the process of triggering a protection system for occupants of a vehicle, such as an air bag system, if a crash is sufficiently serious.

Other features which are considered as characteristic for the invention are set forth in the appended claims.

Although the invention is illustrated and described herein as embodied in a process and a circuit for controlling the control unit of a system for protecting vehicle occupants, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is a graph showing a progression of a deceleration signal which corresponds, at least approximately, to a progression of an acceleration b/a deceleration a;

FIG. 6 is a view similar to FIG. 5 of a progression of a forward propulsion of the occupant, corresponding approximately to the progression shown in FIG. 1;

FIG. 8 is a graph of an example of a greatly enlarged portion of FIG. 5, namely from a progression of the partial ACTUAL loss in speed.

DESCRIPTION OF THE PREFERRED EMBODIMENTS

Figure 3:
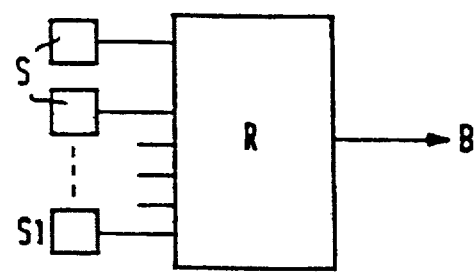
FIG. 3 is a block circuit diagram of a control unit which can be operated according to the invention.

Referring now to the figures of the drawing in detail and first, particularly, to FIG. 3 thereof, there is seen an example of a control unit which can be operated according to the invention and which triggers a protection system if there is a sufficiently serious crash. This control unit contains a plurality of sensors S, S1 as well as a computing unit R. The computing unit R can generate a control signal B, according to the invention, for triggering the protection system, dependent on a plurality of ACTUAL values which describe the course of the accident and for their part are determined by the computing unit R from sensor signals.

What is special about this control unit is, in particular, the algorithm used by the computing unit R.

It is initially preferred to go into details regarding a first variant of the invention, before going into details regarding a second variant. For this purpose, first of all typical progressions of sensor signals and ACTUAL values determined therefrom as well as typical progressions of a triggering threshold value determined according to the invention will be dealt with, before finally dealing with examples of the structure of the algorithm configured according to the invention.

In the case of the first variant, it is often adequate to use a single crash sensor in order to control the controlling of the occupant protection system protecting against frontal collision and oblique collision, for example a corresponding air bag, even if the angle of the collision direction may differ considerably. The expenditure which is necessary for the invention is thus already low in this respect. The sensitivity of this crash sensor may be substantially forwardly directed. Its output signal corresponds to the ACTUAL deceleration of the vehicle. To be more precise, it corresponds to the deceleration of the crash sensor in this vehicle. However, in order to control an occupant protection system protecting against side collision, for example a side air bag, in fact an additional crash sensor, oriented in the manner adapted to side collision, may also be used. Its output signal too can be evaluated in a way according to the invention with fluctuating triggering threshold values.

If necessary, the deceleration signal supplied by the crash sensor, such as for suppressing higher-frequency natural vibrations of the crash sensor, can be additionally smoothed by a frequency filter and/or it can exhibit other corrections, for example in order to achieve a better linearization of the magnitude of the deceleration signal, relative to the ACTUAL deceleration value in fact existing in each case.

By way of example, FIG. 5 Shows a typical progression of a deceleration signal a of a forwardly directed crash sensor in the case of a collision of a particular vehicle type traveling at about 50 km/h obliquely at 30° with a stationary obstacle. Plotted on the x axis is a time t in msec units, and on the y axis is an acceleration b in g units, that is as a multiple of the gravitational acceleration $g=10$ m/sec$^2$.

Since in the case of this accident decelerations occur in particular, that is negative accelerations b, in FIG. 5 the negative acceleration=deceleration a is also indicated on the y axis, although then, for this deceleration a, the values indicated on the y axis first have to be multiplied by $-1$. After about 45 msec, extremely strong decelerations a of far in excess of 10 g occur, with the deceleration a dropping again below 10 g only after 87 msec. It is assumed for the sake of simplicity that the crash sensor concerned supplies corrected deceleration signals to the computing unit, that is to say that the amplitude of the deceleration signals a depends linearly on the true deceleration a.

During the accident, the computing unit being used for the evaluation of the deceleration signal a constantly carries out integrations, for example beginning from a starting time 1 shown in FIG. 5 and being triggerable by the deceleration signal a, up to a respectively instantaneous time tx, for example in order to thus determine the respective ACTUAL loss in speed ΔV.

In the case of integrating it is also possible to use an "accumulator register", that is a register in which the digitized ACTUAL deceleration signal a is not stored there, but in which the instantaneous ACTUAL deceleration value a is continuously ADDED to the ACTUAL value stored there thus far.

In order to calculate the partial ACTUAL loss in speed ΔV, use is made of a single time integration of the respective ACTUAL deceleration signal a over a time duration ΔT which is short in comparison with the duration of the crash event:

$$\Delta V = \int_{tx-\Delta T}^{tx} a \cdot dt$$

In order to calculate this partial ACTUAL loss in speed ΔV, it is in fact also possible to use a subtraction element, similar to that described in German Patent DE 41 17 811 C2. However, for this purpose, it is also possible to use two accumulator registers, for example. In the first of these registers, as described above, the ACTUAL deceleration values a are continuously added for the first integration from t1 to tx, and in the second of these registers, delayed by ΔT, with the same ACTUAL deceleration values a being added for the integration from t1 to (tx–ΔT), after which the difference between the values respectively stored in the two accumulator registers finally represents the partial ACTUAL loss in speed ΔV.

According to requirements, that time duration ΔT is, for example, 5 msec or 7 msec, so that in each case the time duration only begins in the advanced accident phases after the starting time 1 and, as a result of which, in these later accident phases this short time duration ΔT is shorter than the duration of the accident thus far (tx–t1), such as the times indicated in FIG. 5.

Figure 7:
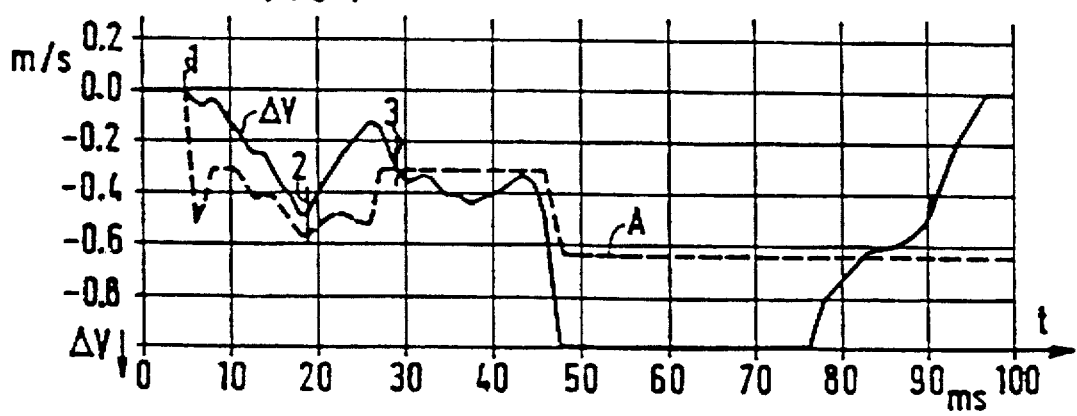
FIG. 7 is a view similar to FIGS. 5 and 6 of a progression of a determined partial ACTUAL, loss in speed, corresponding approximately to the progression shown in FIG. 1, as well as an associated progression of a triggering threshold value being respectively defined at any instant.

That progression of ΔV which belongs to the progression of the deceleration a shown in FIG. 5 is shown by way of example in FIG. 7 as a solid line in m/sec units. This progression of ΔV is in fact determined by the computing unit in the range from t=48 to 76 msec, but for reasons of scale it is no longer plotted to scale in FIG. 7.

A progression of a triggering threshold value A, which is respectively defined continuously at the various times tx by the computing unit, is also plotted as a dashed line in FIG. 7. Examples of formulae by which the relevant triggering threshold values A can be defined will be given below.

The computing unit constantly compares the ACTUAL loss in speed ΔV which is determined by itself, in this case the partial loss by way of example, with the time-variable triggering threshold value A that is likewise determined by itself.

According to the wording chosen in the instant application, a "great" (or "small") loss in speed is intended to mean:
  that the speed is decreased by a great (small) absolute amount.

In addition, in this case a "great" (or "small") triggering threshold value A is intended to mean:
  that this triggering threshold value A can be reached only in the case of a great loss in speed ΔV (or already by a small loss in speed),
  or, for example, that this triggering threshold value A can be reached only in the case of a great (or small) absolute amount of the deceleration a, or else of an ACTUAL average value $\bar{a}$ of the decelerations a thus far.

Times 1 to 3 are plotted in the two progressions shown in FIG. 7 and are also indicated in FIG. 5:

The time 1 is the starting time t1, at which the computing unit begins to integrate, and the time 3 is the time at which the ΔV progression intersects the progression of the variable triggering threshold value A, which is plotted as a dashed line. At this intersection/time 3, the computing unit makes the ultimate decision that the protection system is to be triggered.

In the illustrated example, the time 2 is revealed by FIG. 6. FIG. 6 shows a progression of a forward propulsion s of the occupant, which the computing unit determines by double time integration of the deceleration a that is related, for example, to the total duration of the accident since the starting time 1, for example according to the formula:

$$s = \int_{t1}^{tx} \left( \int_{t1}^{tx} a \cdot dt \right) \cdot dt$$

or taking into consideration further factors such as, for example, the European Application 0 327 853 A1 already mentioned above. In principle, double integrations of this type can be achieved, for example, by two accumulator registers, in such a way that, for example, a result of the first integration, stored in one of these registers, is additionally added continuously to the value stored thus far in the other of these registers, and the result stored at any instant, or in real time, in the second register then corresponds to the ACTUAL value of the double integral.

However, in the example shown, as soon as the forward propulsion s exceeds a (lower) limit value, which in the example shown in FIG. 6 lies at 1.25 cm, the computing unit decides only that triggering MAY be carried out. However, according to the invention, the computing unit ultimately decides whether or not triggering MUST be carried out at all only at the time 3.

Since the time 2 lies before the time 3 in the example shown in FIG. 7, at the time 3 the computing unit also immediately initiates the triggering of the protection system. If, however, the time 2 were to lie after the time 3 in FIG. 7, then the computing unit would in fact have established at the time 3 that triggering must be carried out, but the computing unit would not have ultimately started the triggering, for example by firing an explosive charge of an air bag, until the then later time 2.

In fact it is favorable, as is known per se, to additionally fix an upper triggering threshold value for the determined forward propulsion s, above which the protection system must NOT be triggered any longer. However, in order to avoid making the present description too complicated, FIG. 6 does not indicate this additional, upper triggering threshold value any more precisely. A person skilled in the art will not have any difficulties with the process according to the invention in additionally taking into consideration such an upper triggering threshold value for s by correspondingly supplementing the algorithm. The invention thus allows its computing unit to likewise take into consideration the ACTUAL forward propulsion s of the occupant, in particular in order to optimize the firing time of the protection system, such as, for example in European Application 0 327 853 A1.

FIG. 7 shows that the computing unit assigns a variable instantaneous triggering threshold value A to the respectively determined ACTUAL value, in this case the partial ACTUAL loss in speed ΔV related to the time duration ΔT. The variable instantaneous triggering threshold value A which herein in any case is in the time between 5 and 27 msec, constantly becomes alternately greater and smaller again by amounts which at any instant, or in real time, are usually small but differ in each case. In the case of the example shown, the triggering threshold value A thus does not fluctuate between a constantly equal maximum value and lower intermediate values, but in principle, at least during lengthy accident phases, it continuously fluctuates back and forth between any desired values.

In the case of the invention, the progression of determined ACTUAL values as a function of time, that is, for example, for determined losses in speed ΔV and/or for determined ACTUAL deceleration average values ā, can therefore exhibit within the decision phase and in principle quickly one after the other in each case, a plurality of maxima (that is considerable losses in speed/considerable decelerations) and a plurality of minima (that is low losses in speed/low decelerations). In this case, the triggering threshold value A may generally even change with similar quickness to the respectively determined ACTUAL value ΔV, and more precisely in each case up and down by finely apportioned greater and smaller amounts, which are sensitively adapted individually to the relevant evolvement of the accident.

Before going into the structure of an algorithm by which the computing unit can calculate the instantaneous triggering threshold value according to the invention, first of all further possibilities of forming determined ACTUAL values are to be dealt with.

FIG. 7 shows that the computing unit operated according to the invention can additionally preset the instantaneous triggering threshold value A in a more or less fixed manner, instead of in a fluctuating manner, at certain times to certain triggering threshold values adapted to the vehicle type concerned, such as the relatively late accident phases from 27 to 100 msec, in which the triggering threshold value A would in fact assume extreme values in the upward and downward directions if it were to continue to fluctuate. As a result, the computing unit can also make the triggering decision in an appropriate way, that is well-apportioned, even under such extreme special conditions of this evolvement of an accident. For this purpose, the computing unit exceptionally defines a triggering threshold value A which is adapted to the vehicle type, for example under time control for a certain time period, such as 27 to 46 msec, which in this case is relatively high, although the algorithm which prescribes the calculation of the instantaneous triggering threshold value A to the computing unit would in fact initially produce distinctly lower values there for the triggering threshold value A. In a similar way, the computing unit also defines a further triggering threshold value A, for example for the time duration between 48 and 100 msec, although the same algorithm would there again, in principle, initially produce much greater values there for the triggering threshold value A.

In order to take special conditions, which are adapted to the special properties of the vehicle type concerned, into consideration, the invention thus allows the triggering threshold value A to also be treated exceptionally for certain phases of the evolvement of an accident as a time-constant value, or to be made otherwise independent of the instantaneous progression or progression thus far of determined ACTUAL values in these phases. While being adapted to the vehicle type concerned, these triggering threshold values may, for example, be preset in a fixed manner:

* in such a way that the relevant determined ACTUAL value in the case of a (not too) slow 30° oblique collision can still reach this preset triggering threshold value A easily enough and then trigger the protection system;

and/or in such a way that the determined ACTUAL value as compared with the preset triggering threshold value A in the case of a particularly slow frontal collision no longer reaches the triggering threshold value and consequently no longer triggers the protection system.

However, during all other accident phases, the computing unit continually redefines a triggering threshold value A which is rapidly variable over time, indirectly or directly in dependence on the instantaneous fluctuations in the progression of the deceleration signal a and consequently is dependent on the ACTUAL value/on the ACTUAL values, such as the partial loss in speed ΔV. In the case of the early time periods of the evolvement of an accident, which are particularly critical in the case of high traveling speeds and in the case of a frontal collision, which is <27 msec in the example shown, the triggering threshold value A defined by the computing unit thus fluctuates continuously and very rapidly according to the invention, as is clearly evident, in a finely apportioned way according to the invention.

The invention allows this rapid changing of the triggering threshold values A according to the invention, to be achieved with even relatively little technical expenditure, namely by correspondingly operating the computing unit existing in any case and evaluating the deceleration signal a in a well-apportioned manner.

The invention consequently specifically allows the decelerations a/losses in speed ΔV occurring during a last short time duration, such as ΔT, to be taken into consideration in a particularly well apportioned manner. This is favorable in particular in the case of a multiple collision following in rapid succession, for example with a number of slats of a fence one after another.

However, the invention is not restricted to a process in which the computing unit determines only ACTUAL values having the specific physical-mathematical dimension described above of "partial loss in speed", in order to compare the latter with a continuously redefined, upwardly and downwardly fluctuating triggering threshold value A. In principle, the computing unit can also determine other ACTUAL values having other physical-mathematical dimensions, in order to compare these ACTUAL values with a corresponding upwardly and downwardly fluctuating triggering threshold value A, that is likewise continuously redefined by the computing unit. For example, the invention allows an ACTUAL deceleration average value ā to also be determined and this ACTUAL value to be assigned a triggering threshold value A fluctuating rapidly and in a finely graduated manner according to the invention. For this purpose, the progression of the deceleration signal a of a forwardly directed crash sensor shall again be looked at, as is shown by way of example in FIG. 5:

In this case too, during the accident, from the starting time 1=t1, the computing unit used for evaluating the deceleration signal a also carries out, inter alia, the integrations, which are triggerable, for example, by the deceleration signal a. It is additionally assumed in this case by way of example that the computing unit determines this ACTUAL deceleration average value ā for the vehicle type concerned, not by a division of the partial ACTUAL loss in speed by the total duration thus far of the accident, but by a division of the total loss in speed thus far by the total duration thus far of the accident since the starting time 1.

Then, the computing unit therefore initially carries out a single time integration of the ACTUAL deceleration signal a over the total time duration (tx−t1), in order to determine the total loss in speed thus far as the ACTUAL value:

$$\Delta V = \int_{t1}^{tx} a \cdot dt$$

Subsequently, the computing unit divides this ΔV ACTUAL value by the time duration of the course of the crash which has elapsed since the starting time 1, as a result of which it approximately determines the actual deceleration average value ā related to the starting time 1:

$$\bar{a} = \Delta V/(tx-t1).$$

The computing unit subsequently compares the ACTUAL value ā which is thus determined with a triggering threshold value A that is defined by it according to the invention.

Incidentally, these determined ACTUAL values ā fluctuate less as the time duration (tx–t1) becomes greater. In particular, however, whenever the relevant loss in speed ΔV respectively represents the partial loss in speed, which was assumed in FIG. 7, those fluctuations of the relevant ACTUAL deceleration average value ā which only occur in late phases of this accident are then only comparatively small, because division is by the total time duration (tx–t1) since the starting time 1, while ACTUAL deceleration average values ā which occur at the beginning of the (presumed) evolvement of an accident often very rapidly reach extremely high amounts. If the computing unit forms the instantaneous triggering threshold value A on the basis of the ACTUAL deceleration average value ā, then the ACTUAL deceleration average values ā in these late accident phases often only have little influence on the continuous fluctuations of the triggering threshold value A to be defined.

The progression of this ACTUAL deceleration average value ā does not in fact correspond precisely to the progression of the partial loss in speed ΔV shown in FIG. 7 if the deceleration signal a progresses according to FIG. 5. Then, however, the progression of the ACTUAL deceleration average value ā nevertheless represents a curve fluctuating quite unsteadily up and down according to the invention. Even the triggering threshold value A may then fluctuate in a way similar to that in FIG. 7 whenever the progression of the triggering threshold value A is defined according to the invention. The computing unit then constantly compares the ACTUAL deceleration average value ā determined by it with the triggering threshold value A variably defined by it in a finely apportioned manner. However, even in the case of this sub-variant of the invention, the computing unit can, for special conditions, preset the instantaneous triggering threshold values A in a fixed manner instead of in a fluctuating manner for certain periods of time.

The invention thus allows specific mechanical-physical properties of the obstacle, for example its weight and/or relative speed, to be approximately detected, in particular from the progression of such, or other, determined ACTUAL values, or it allows the triggering threshold value A to be adapted in a corresponding way to the progression of such determined ACTUAL values. Otherwise, the invention allows ACTUAL average values over time to be formed by divisions and consequently also allows, for example, the duration thus far of the most important phases of the evolvement of an accident to be taken into consideration, as a result of which the computing unit can also distinguish, for example, potholes or edges of curb stones from accidents involving a collision with large or heavy obstacles, in particular because the computing unit can also adapt the instantaneous triggering threshold value A virtually without delay and continuously to the progression at any instant, or in real time, or thus far of the relevant, partial or total, determined ACTUAL value in a particularly sensitive manner.

There are many possibilities for the algorithms according to which the computing unit appropriately fixes the instantaneous triggering threshold value A according to the invention for the respective vehicle type. These also include algorithms which are particularly easy to implement:

In order to adapt the triggering threshold value A without delay, continuously, and consequently particularly sensitively in usually small steps, to the progression thus far of the deceleration signal a and/or to ACTUAL values determined therefrom, the triggering threshold value A can be made dependent, for example, on the amount of an ACTUAL deceleration average value. For this purpose, the computing unit can thus define the instantaneous triggering threshold value A by a division of an ACTUAL loss in speed ΔV determined at any instant, or in real time,

* for example the partial or the total ACTUAL loss in speed, by a time duration, or
* for example by the total time duration thus far (tx–t1) or by part thereof and consequently by determination of a corresponding ACTUAL deceleration average value ā. A triggering threshold value A which is defined in this way then generally changes comparatively uniformly, instead of abruptly, in a way corresponding to the changes at any given instant of the relevant ACTUAL deceleration average value ā.

The computing unit can make the triggering threshold value A dependent on the amount of such an ACTUAL deceleration average value ā, for example in such a way that the triggering threshold value A becomes smaller (or greater) with a rising (or falling) amount of the ACTUAL deceleration average value. This allows the triggering to be avoided in the case of short severe impacts which are caused, for example, by potholes or edges of curb stones, because the value ā assumes progressively smaller amounts,

* in particular if this value ā is formed by division of partial losses in speed ΔV by the total accident duration thus far (tx–t1), the longer the time duration (tx–t1) lasts. In other words: the amount of the value ā thus determined is particularly great in the first milliseconds of the (actual or presumed) accident, so that in these first milliseconds the triggering threshold value A is very high, namely too high for deceleration signals a which occur due to driving over potholes and edges of curb stones. The fluctuations of the determined ACTUAL values, as compared with the instantaneous triggering threshold values A, which occur only in later phases of this accident,

* that is, for example, then occurring fluctuations of the relevant ACTUAL deceleration average value ā and/or of the relevant, in particular partial, ACTUAL losses in speed ΔV, have only comparatively little influence on the continuous fluctuations of the triggering threshold value A to be defined. A steep rise in the relevant determined ACTUAL values in these later accident phases thus only raises the instantaneous triggering threshold value A there relatively slowly, as a result of which the severe crash in these later accident phases rapidly causes the computing unit to trigger the protection system.

The invention allows even marked fluctuations of the deceleration signal which occurred in already elapsed phases of this accident to be taken into consideration, and consequently represent, for example, phenomena typical of the specific vehicle type concerned, for a collision from a certain direction and/or for a collision with obstacles which yield in a certain way, such as bushes, trees or animals, or for a collision with obstacles of very high mass, such as walls. For this purpose, the computing unit can make the instantaneous triggering threshold value A dependent

* not only on determined ACTUAL values,
* but also on one or more stored amounts ("past values"), that is even on values which have been determined by the computing unit during previous phases of this accident.

For this purpose, as past values, the computing unit can use for example, losses in speed ΔV determined earlier, such as in FIGS. 7 and 8, with FIG. 8 representing a greatly enlarged portion of the progression of the loss in speed ΔV, which in this case, by way of example, is a partial loss in speed. In order to define the instantaneous triggering threshold value A, the computing unit can then also use, for example, those losses in speed ΔV which were determined, at least by approximation, beforehand in the case of the same accident, when the respectively last minimum ΔVmin and/or the maximum ΔVmax respectively preceding the last minimum ΔVmin of the progression thus far of the (for example partial) loss in speed ΔV occurred.

Such maxima and minima are particularly useful for distinguishing between types of accidents: they namely allow the computing unit to detect whether the evolvement of an accident in question

* concerns an obstacle which is initially hard, but then quite yielding, such as, for example, not very thick, small trees or fences that are breaking off, or relatively yielding parts of an opposing vehicle, such as, for example, its trunk, or perhaps even an obstacle which it collides with obliquely and therefore produces an initially hard impact but then is comparatively quite yielding, or whether the evolvement of an accident in question * concerns an obstacle which is less yielding, that is to say produces correspondingly high maxima, or perhaps even an obstacle which is collided with frontally and can likewise produce correspondingly high maxima.

In the case of the invention, these maxima and minima may also have less pronounced average absolute amounts that are dependent, for example, on the angle of the direction of impact with respect to the longitudinal axis of the vehicle type concerned. The invention can thus also respond in a finely apportioned manner to the respective angle of the obliqueness with which the collision occurs.

Tests have shown that it is often particularly favorable to make the triggering threshold value additionally dependent on further criteria. It has thus been shown that often, for additionally raising or lowering the triggering threshold value A, a typical decline, not the rise!, of the relevant determined losses in speed ΔV should be used as a significant past value: for this purpose, the computing unit can use, for example, the difference ΔV− shown in FIG. 8, between the maximum and minimum amounts $$\Delta V-=(\Delta V\text{max}-\Delta V\text{min})$$

of the, for example partial, losses in speed ΔV during the last minimum and during the maximum preceding the last minimum in time, namely precisely in such a way that the instantaneous triggering threshold value A becomes greater (or smaller) with a rising (or falling) difference ΔV−.

An even better-optimized apportioning of the raising/ lowering of the triggering threshold value A is often achieved not by the absolute amounts, but by relative amounts of the relevant differences ΔV− being used. In the case of this process, the difference ΔV− is thus additionally divided, for example, by the amount of that loss in speed ΔVmax which has been determined, at least by approximation, for the relevant maximum, or by the amount of that loss in speed ΔVmin which has been determined, at least by approximation, for the relevant minimum. Just such relative values allow conclusions to be drawn as to the collision direction, as well as to other typical accident features, such as a collision with posts, or a laterally offset collision, in each case in dependence on the vehicle type concerned, which are able to be established by the evaluation of corresponding crash tests.

In the context of using such relative-value determinations indirectly, in particular in order to also be able to detect and take into consideration the ACTUAL vehicle speed by approximation from the measured ACTUAL deceleration values a, the computing unit can also divide, at least by approximation, that difference $$\Delta V-=(\Delta V\text{max}-\Delta V\text{min})$$

between the last minimum and the maximum directly preceding it in time by the amount of the time period ΔT between the relevant minimum and maximum, such as in FIG. 8. Tests have shown that this specific difference, even when made relative over time, is quite informative with regard to the instantaneous vehicle speed, and is usually also more important than the difference between other maxima and minima.

In particular, in the case of a multiple collision following in rapid succession, for example in the case of a collision with small trees or fence parts that are close to one another, or in the case of a collision by relatively yielding parts of the vehicle in question with a foreign obstacle, in order to be able to use only the last of these collisions in each case as substantially co-determining for the following definition of the triggering threshold value A, the computing unit can define the triggering threshold value A in such a way that this threshold value is NOT, or is NO LONGER, influenced by the difference between the amounts of the other past values (ΔVmax−ΔVmin) between a minimum ΔVmin, lying before the last minimum in time, and the respectively preceding or other maximum ΔVmax.

Consequently, in the case of the first variant of the invention, the computing unit can, for example, use the following algorithm for defining the triggering threshold values A, which in each case is very simple and can be rapidly handled by the computing unit:

$$A = K2\cdot(\Delta V-)/(\Delta V\text{max}\cdot\Delta t) - K1\cdot\bar{a} + K3.$$

The components K1, K2 and K3 are constants/weighting factors which allow the weights of the individual components on the right-hand side of this equation to be fixed in such a way that the algorithm is optimally adapted to the respective properties of various vehicle types in the case of their oblique collision and frontal collision. In addition, the structure of this equation as such then generally need no longer be redeveloped for different vehicle types. In this case, the mathematically defined, triggering threshold value A is thus dependent on a total of three components, of which

* the one component $K1\cdot\bar{a}$ is dependent on the amount of the ACTUAL deceleration average value, weighted by K1,

* a further component $K2\cdot(\Delta V-)/(\Delta V\text{max}\cdot\Delta t)$ is dependent on the relevant past values, weighted by K2,

* whereas the third component K3 is added to the two other components as a superposed constant/weighting factor, as a result of which a basic amount is defined for the triggering threshold value A which can reduce the significance of the two other, time-variable components of the triggering threshold value A to a desired value, without considerably complicating the computing effort for the computing unit.

This relatively simple equation for the triggering threshold value A is thus distinguished, inter alia, by the fact that the two time-dependent components are in each case represented by an element of a mathematical difference, in which

* one component, forming the subtrahend, contains the amount, weighted by K1, of the ACTUAL deceleration average value $\bar{a}$ which is determined, for example, according to the equation:

$$\bar{a} = \left( \int_{tx-\Delta T}^{tx} a \cdot dt \right) / (tx - t1)$$

from the partial ACTUAL loss in speed ΔV, divided by the total accident duration thus far,
* and the other component, forming the minuend, contains the difference, weighted by K2, and made relative in two respects (namely in terms of time and with regard to amplitude) between the amounts of the relevant past values.

In order to be able to additionally particularly easily detect particularly very hated frontal collisions at a high traveling speed of the vehicle concerned, the computing unit can also make the instantaneous triggering threshold value A dependent on a slope or rise value, which the computing unit determines by an additional time differentiation of the acceleration signal a.

In the following, the second variant of the invention will be given preference:

There too, the crash cases are not, or not only, dealt with in a differentiated way with regard to the collision direction, but in particular (also) with regard to the different progressions of the ACTUAL values I within the same collision direction. Therefore, at least two of the triggering threshold values in each case are defined there imprecisely by guide values, that is in a way similar to that in the case of fuzzy logic.

The guide values may thus be respectively overshot and undershot by the assigned ACTUAL value without themselves immediately having an influence on the triggering, because the guide values only imprecisely define the relevant triggering threshold value. The amount by which the relevant ACTUAL value can actually deviate in each case from the assigned guide value before that limit is reached at which this ACTUAL value itself ultimately instigates triggering, depends on the respective progression of the remaining ACTUAL values and on their guide values. In particular, this variant of the invention allows triggering of the protection system at the correct time even
* if one or some ACTUAL values have not yet quite reached their directly assigned guide value,
* when, however, other ACTUAL values have long since reached their directly assigned guide value and consequently have long since arrived in their triggering value ranges.

In the case of this second variant of the invention, as is further explained below, the algorithm handles each variable triggering threshold value, for example, in such a way that the latter in each case itself
* exhibits one or more inner limit values and outer limit values, as well as
* in order that there are defined inner triggering value ranges which although still bounding their inner limit values are no longer bounding their outer limit values,
* and there are defined outer triggering value ranges which only bound their outer limit values, but contain within them the relevant inner limit values, with the algorithm defining the amounts applicable at any instant, or in real time, for the relevant variable triggering threshold values from case to case, dependent on the amount of the respective ACTUAL value which is INDIRECTLY assigned. The relevant triggering threshold values, which are variable to greater or lesser degrees from case to case, thus correspond then respectively to a guide value from which the algorithm can deviate by using one or more "secondary values" of the guide value.

In the case of the invention, in the extreme situations in which one, or simultaneously more than one, of the ACTUAL values I exhibit unusually extreme amounts, the protection system can be triggered more quickly, that is to say earlier and consequently at an optimized time, in comparison with the known prior art, because the prior art systems would wait to ascertain whether or not all of the remaining, fixed, limit values are also reached by the relevant ACTUAL values I, so that in that prior art the optimum triggering time may have long since passed.

Figure 1:
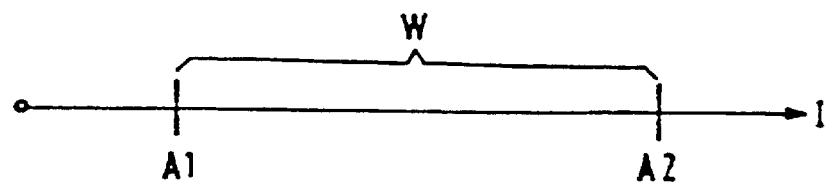
FIG. 1 is a diagram showing a plurality of different ACTUAL values in a triggering value range according to the prior art.
Figure 2:
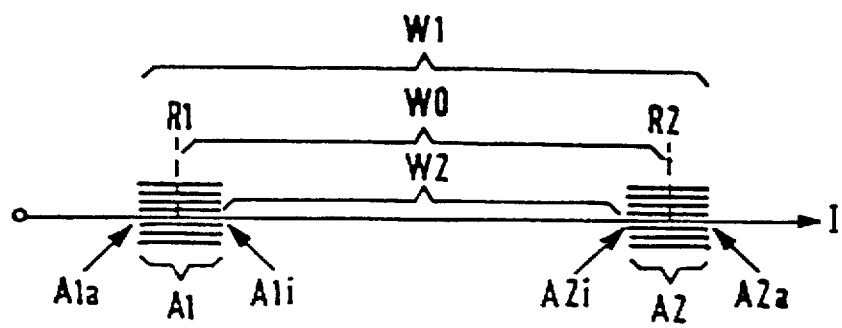
FIG. 2 is a diagram similar to FIG. 1 showing a bounding of a triggering value range according to the invention.

The difference between the triggering value ranges and the triggering threshold values and guide values of this variant of the invention on one hand, and the triggering value ranges and the triggering threshold values in the case of the prior art, is evident in particular from a closer comparison of the examples shown in FIGS. 1 and 2:

According to the algorithm used by the computing unit, in order to perform triggering, both in the case of the prior art according to FIG. 1 and in the case of the invention according to FIG. 2, a plurality of different ACTUAL values I have to lie simultaneously in the triggering value ranges assigned to them, which for the prior art in each case lie in a triggering value range W that is precisely delimited there and, in the case of the invention, in similar, but variably delimited triggering value ranges W1/W0/W2. At least two triggering value ranges have variable triggering threshold values, which themselves represent "secondary values" A1a, A1i, A2a, A2i of guide values, such as R1 and R2. These secondary values may include, for example, band widths A1a/A1i and A2a/A2i indicated in FIG. 2, around the respective guide values R1, R2. The guide values R1, R2 defined according to the invention obviously have the same physical units in each case as the various ACTUAL values I being respectively compared with them.

According to the invention, the relevant variable limit values R1, R2 are also not dependent alone on simple YES/NO criteria, that is, for example, they are not alone dependent on whether or not the occupant has put on a seat belt, even if such YES/NO criteria may also additionally have an influence on the magnitude of the guide values in the case of the invention. The triggering threshold values which are variable according to the invention are namely values that exhibit finite amounts, but their secondary value which is applicable at any instant, or in real time, depends on the instantaneous amount of one or more ACTUAL values I, and perhaps additionally also on YES/NO criteria.

Accordingly, in the case of this variant of the invention, at least one of the sub-algorithms exhibits a structure of the formula on which it is based, that combines at least two different ACTUAL values I with each other and/or that algebraically links them to one another in such a way that, at least de facto, it is not always a fixed triggering threshold value that fixes the relevant limit of the triggering value range W but, given certain ACTUAL values I, it is a more or less deviating secondary value of the guide value, being variably adapted. In the case of this second variant of the invention, the secondary value ultimately used by the algorithm may, for example, be higher or else lower than the relevant guide value.

This variant of the invention can also be interpreted in such a way that in it at least individual values of the variable triggering threshold values are weighted with respect to one another, so that as a result of one ACTUAL value I already lying lower in its triggering value range, the other variable triggering threshold value or values affected by it and indirectly assigned are for their part changed to a greater or lesser degree in a way corresponding to their own weighting.

This variant of the invention thus allows, for example, the protection system to be triggered even whenever a sensor signal indeed indicates that an unusually severe deceleration of the vehicle is concerned (extreme ACTUAL value I1), although, for example, the minimum value that is otherwise in fact usually required as a prerequisite for triggering (triggering threshold value A1) for the ACTUAL speed of the vehicle (which has the ACTUAL value I2) is still undershot. In the case of this variant, the protection system can thus be triggered earlier than in the case of the known prior art, because the prior art systems would wait in the crash case concerned in order to ascertain whether or not all of the remaining ACTUAL values Ix also reach their triggering value ranges Wx, being defined by fixed limits.

In the case of this variant of the invention, the amount of such variable triggering threshold values being actually applied in the individual crash case thus ultimately depends on how much one or more of the remaining triggering threshold values have already been overshot or undershot by the remaining ACTUAL values I assigned to them, namely they

* are overshot in the case of triggering threshold values which represent values above which triggering is in fact to be carried out, or
* are undershot in the case of triggering threshold values which represent values below which triggering is in fact to be carried out, to be precise, they are overshot or undershot so much that, according to these remaining limit values, as far as they themselves are concerned, the preconditions for going ahead with triggering had long since been satisfied.

The different ACTUAL values I have different physical units. For example, depending on the rules applied for the triggering of the protection system, they represent ACTUAL decelerations I having the unit travel/time$^2$, and/or ACTUAL speeds I having the unit travel/time, and/or integrals I of the decelerations having the unit travel/time=loss in speed, and/or integrals I of the speeds having the units travel= forward propulsion, etc., etc.

The computing unit R determines such ACTUAL values I from the output signals of the single sensor S or the plurality of existing sensors S. It should be noted for this variant of the invention that apparently identical physical units of ACTUAL values I are also to be considered as "different" physical units for example "speed"="travel/time", if the algorithm determines them in different ways and they consequently concern fundamentally different physical conditions, for example if the algorithm determines the ACTUAL value I once directly, for example the vehicle speed according to the number of revolutions of the speedometer drive shaft, and additionally also a different way, for example by an integration, that is, for example, from the "integral of the deceleration determined thus far over time"="loss in speed since beginning of crash", or through a differentiation by the wheel rpm sensor, for example "differential of the number of revolutions of the (blocked or non-blocked) wheels after time, multiplied by a constant"="speed of the running surface of the wheel concerned".

Some ACTUAL values I can in fact be supplied directly to the computing unit R, for example by special sensors S, such as in FIG. 3. However, the computing unit can determine some of the ACTUAL values I from the output signals of the sensors S by computing. In the sense of this variant of the invention, they then represent different ACTUAL values I having different physical units, even if all three of them correspond to the unit "travel/time".

In the case of the invention, each ACTUAL value I may even be assigned variable limit values, according to the invention. The individual limit values may even be variable in different ways as desired, according to requirements, for example they may also be variable differently from vehicle type to vehicle type, that is, for example, they may cover different band widths for the assigned secondary values, for example even the variable in jumps for the one ACTUAL value I but also, for example, they may be variable continuously for the other ACTUAL value I.

In principle, depending on the respective requirement, the variable triggering threshold values A1, A2 in each case can at the same time bound at least three different types of triggering value ranges:

1. triggering value ranges which exhibit only a lower limit value A1, so that above this all of the associated ACTUAL values I, theoretically up to the value INFINITY, lie in the triggering range; for example: triggering only whenever a minimum value of the integral of the decelerations over time is given or overshot;

2. triggering value ranges which exhibit only an upper limit value A2, so that below this all of the associated ACTUAL values I, that is theoretically also down to the value ZERO, lie in the triggering value range; for example: triggering only whenever a maximum deceleration is given or undershot; and 3. triggering value ranges which exhibit both a lower limit value A1 and an upper limit value A2, between which the triggering value range lies; for example: triggering only whenever the speed lies between a minimum speed and a maximum speed.

It is in fact possible to allow only two fixed secondary values for the relevant variable triggering threshold values, such as A1 and A2, in each case, that is to say only two discrete secondary values. Thus, the algorithm may jump, for example at extremely high traveling speeds, to the one variable limit value and, at normal traveling speeds, to the other variable limit value of minimal deceleration. This is then a case of relatively approximate weighting of the ACTUAL values "traveling speed" and "minimal deceleration", although this type of variation of the limit values concerned already constitutes an advancement.

These jumps to secondary values of a first guide value, which is assigned to a first ACTUAL value I, can be achieved in a simple way, for example, by first of all comparing that other, second ACTUAL value I, on which the jumping of the first guide value is to depend indirectly, directly with that guide value assigned to the second ACTUAL value which for its part likewise exhibits at least two different secondary values. Depending on whether this comparison result reveals that the second ACTUAL value is very much greater than, equal to or distinctly smaller than its secondary values, an assigned criterion in each case can be determined from it as a logical ONE or ZERO, as a command as to whether or not to jump to another of its secondary values in the case of the first guide value. Accordingly, the algorithm then controls the computing unit in such a way that it assigns only the relevant secondary value to the first ACTUAL value.

In a corresponding way, more finely graduated weightings of the variable triggering threshold values can also be achieved, in order to achieve an even better adaptation to extreme cases of different degrees of seriousness in this way. For instance, the algorithm may be configured according to the invention in such a way that it treats at least individual values of the variable triggering threshold values, such as in FIG. 2, in such a way that in each case they can have at least three, for example five, ten or an infinite number of secondary values, namely in each case a central guide value R1, R2, as well as secondary values both thereabove and therebelow. The central guide value R1 and/or R2 then bounds a central triggering value range W0. Depending on the extremity of the relevant first and second ACTUAL values and consequently depending on the type of crash, the algorithm may then in each case also use one or more secondary values of such guide values, lying thereabove and therebelow. If at least three secondary values are assigned to a single guide value, the algorithm fixes the amount of the triggering threshold value which is respectively applicable at any instant, or in real time, in a specific crash case, for example in such a way that the computing unit already triggers the control signal B even

* when all of the ACTUAL values I have just slightly overshot their triggering threshold values being applicable at any instant and consequently have already reached their triggering value ranges, while the computing unit does not yet trigger the control signal B in this third case,

* when even only one of these ACTUAL values I has not yet overshot its triggering threshold value being applicable at any instant and has consequently not yet reached its triggering value range.

Figure 4:
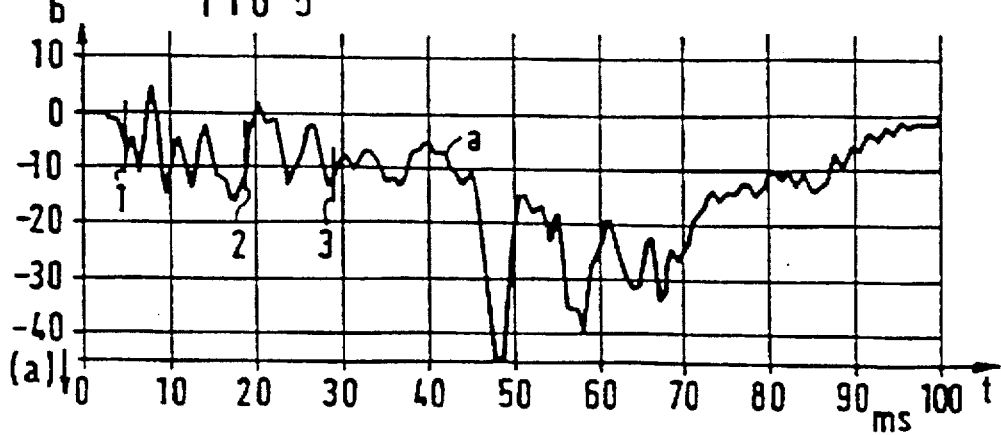
FIG. 4 is a formula which can be used according to the invention for calculating whether or not the protection system is to be triggered.

The second variant of the invention can, for example, be based on the formula shown in FIG. 4. It has, generally formulated, the following structure:

$$[\Sigma(Kx*Ix/Rx)]/\Sigma(Kx) \geq 1$$

wherein Kx in each case is a weighting factor (which may in some cases also itself have a negative value), Ix is an ACTUAL value, and Rx is the guide value assigned directly to this ACTUAL value Ix.

If the result of the left-hand side of this equation is less than ONE, the control unit does not trigger the protection system (yet). However, as soon as this result is (or has become) equal to ONE or greater than ONE, the control unit triggers the protection system.

This formula mathematically represents a fraction. Its numerator represents an aggregate of the weighted (Kx) relative ACTUAL values (Ix/Rx). In this formula, all of the ACTUAL values Ix thus respectively represent relative ACTUAL values, namely quotients of an ACTUAL value Ix above the assigned central limit value Rx which are multiplied by the weighting factor Kx.

Generally and otherwise formulated, this formula represents a mathematically linear function with regard to all of the ACTUAL values Ix. It is an aggregate which contains at least two and in the present case n, different aggregate elements $$Kx*(Ix/Rx)$$

corresponding to the n different ACTUAL values Ix in the example shown.

If some of the weighting factors Kx are positive and some negative, the aggregate result is formed by algebraic adding and subtracting of the individual aggregate elements.

A special feature of the notation for this formula is that, as a departure from the example of the formula specified above with respect to FIG. 7, there is not a single triggering threshold value A explicitly specified on the right-hand side of the formula, but only the condition "$\geq 1$". If the left-hand side of the formula meets this condition, the computing unit triggers the protection system. Thus, instead of an explicitly specified instantaneous triggering threshold value A, this formula only explicitly contains the guide values Rx, as well as implicitly, because of the condition "$\geq 1$", with the secondary values being applicable at any instant, or in real time, of these guide values Rx. This notation of the formula is favorable for the second variant of the invention, for the very reason that it does not have to compare a single triggering threshold value with a single assigned ACTUAL value. The computing unit preferably also computes according to this formula to test whether in the case of the respectively given ACTUAL values Ix triggering is already to be carried out or is not yet to be carried out.

The values Ix thus represent, for example, the following values, which have been determined at, or up to, the relevant instant: ACTUAL values of the speed, of the deceleration, of the integral of the deceleration over time (=loss in speed) and of the integral of the loss in speed over time (=approximately the forward propulsion s of the vehicle occupant).

The weighting factors Kx thus represent the various weights of the individual algorithm elements/aggregate elements within the aggregate, that is the relative values for the significance of the relevant ACTUAL value Ix and its guide value Rx, as compared with the significance of the remaining ACTUAL values Ix and their guide values Rx. If the weighting factor Kx in an aggregate element is great (small) with respect to the weighting factors Kx of the other aggregate elements, the directly assigned ACTUAL value Ix namely has a particularly great (small) influence on whether the result of the formula is less than or greater than ONE. If all of these weighting factors Kx are themselves equal to ONE in each case, all of the aggregate elements Ix/Rx are equal weights in comparison with one another. However, the decision as to which weights are assigned to them depends on the respective strategy which is being used as a basis for the triggering for the vehicle type that is respectively concerned. For example, the aggregate element which corresponds to the integral of the losses in speed may be assigned a particularly high priority, that is to say this element may be assigned a particularly great Kx. On the other hand, for example, an aggregate element which corresponds to the ACTUAL traveling speed may perhaps be assigned a relatively small priority and consequently a relatively small Kx value.

The sum specified in the denominator represents the sum of all of the weighting factors Kx, so that the aggregate is equal to ONE if, on average, all of the ACTUAL values Ix being considered come similarly close to their limit value Rx, wherein some are already slightly thereover, and some still are slightly thereunder, when the triggering occurs. Incidentally, as soon as all of the ACTUAL values Ix are exactly equal to the limit values Rx assigned to them, triggering is likewise carried out, because all of the actual values Ix have just reached their guide value Rx. The denominator of the fraction represents the sum of the weighting factors Kx only because in this way the guide values Rx specified in the numerator actually represent the genuine amounts of the selected guide values Rx in spite of the weighting factors Kx.

This formula treats all of the guide values Rx as CONTINUOUSLY variable triggering threshold values, even all of the other ACTUAL values I1 ... I(x–1), I(x+1) ... In, each for themselves, for de facto CO-DETERMINING, in an INDIRECT way, the secondary value amount, which is applicable at any given instant, of the guide value Rx that is directly assigned to the ACTUAL value Ix. In the case of this formula, the relevant guide values, which in FIG. 4 are denoted by Rx and in FIG. 2 are denoted by way of example by R1 and R2, are namely not varied in jumps, which can easily be established in the formula by inserting actual amounts for the individual parameters. The aggregate is namely configured in such a way that one or more variable limit value Rx must have long since been reached quite distinctly in order to ensure that, de facto, other such variable limit values Rx are distinctly varied by the algorithm. Thus, in this case there are also no singular secondary values of these guide values. By virtue of this extreme fine graduation of the secondary values, a control unit having an algorithm which uses such continuously variable triggering threshold values can particularly easily trigger the protection system at the correct time.

In this case, the margins about which the individual variable limit values Rx are able to change can be fixed as desired by a corresponding choice of the weighting factors Kx for each aggregate element and consequently for each individual guide value/limit value Rx, such as in FIG. 2. Depending on the value of the assigned weighting factor Kx, the secondary values of the guide values Rx can thus correspond, de facto, to bands of a greater or lesser width with imprecise borders. As a result, this further development of the invention allows a particularly good adaptation of the algorithm to the most varied of extreme crash cases.

Incidentally, this formula is particularly simple, in that it requires only algebraic functions, namely divisions or multiplications and additions, and possibly also subtractions. It therefore allows the computing unit R to establish whether or not the protection system is to be triggered, in a particularly simple and particularly rapid way, by the corresponding (sub-)algorithm. The very limited time in the event of a crash is then utilized particularly well. Even in extreme cases, the computing unit R can determine the computation result rapidly, and consequently still in good time, in spite of the limit values Rx being treated as variable values.

However, the invention also allows the algorithm/the sub-algorithm to be based in diverse ways on differently structured formulae and nevertheless to achieve continuous variations of the limit values/guide values Rx:

For example, individual quotients of the quotients Ix/Rx in the formula shown in FIG. 4 may also be substituted by the square ACTUAL value $(Ix/Rx)^2$ or even by values of (Ix/Rx) that are raised to even higher powers. The significance of these aggregate elements within the aggregate then increases all the more, the more the relative ACTUAL value Ix/Rx exceeds the value ONE and the greater its power. This is advantageous in the case of some vehicle types.

Furthermore, instead of the formula shown in FIG. 4, containing an aggregate, it is possible, for example, to use the product, containing all n relative ACTUAL values Ix, $(I1/R1)*(I2/R2)* ... *(In-1/Rn-1*(In/Rn) \geq 1$, with the triggering condition then also being made dependent, for example, on whether this product has become equal to or greater than ONE in the crash case. It is then also the case that the algorithm treats the triggering threshold values Rx as variable guide values.

Mixed forms between the formulae represented in FIG. 4 and the product formula just presented are also possible. For example, likewise similar products can indeed be formed,
for example, again from a plurality, but with only some of the n relative ACTUAL values Ix/Rx, with these products then substituting individual values of the relative ACTUAL values Ix/Rx in the aggregate elements shown in FIG. 4. Thus, the individual aggregate elements shown in FIG. 4 then contain the products of a plurality of relative ACTUAL values (Ix/Rx)*(Iy/Ry), possibly also multiplied by Kx. The various aggregate elements in the thus varied formula are finally also added and/or subtracted, in a way corresponding to FIG. 4, and used as the triggering criterion. Then in each case this product is less complex, and only a few ACTUAL values Ix mutually influence their guide values Rx multiplicatively.

The algorithm can in addition and in a way which is known per se, take into consideration YES/NO criteria which are obtained not from analog or finite amounts of ACTUAL values, in order to change triggering threshold values, such as R1, R2 and Rx, in jumps instead of continuously. For this purpose, additionally one or more sensors, such as S1 in FIG. 3, may supply one or more YES/NO criteria to the computing unit R, for example in order to use different limit values in a way that is known per se, for example being dependent on

* whether passenger seats are occupied or not, in order to trigger the protection system fitted specifically for these seats only when,ever a passenger is actually sitting there, or
* whether the occupant to be protected has put on a safety belt or not, because a person restrained by a belt requires the protection system only in the case of a more serious crash than does a person not restrained by a belt.

In order to simply, rapidly and precisely convert analog output signals supplied by sensors, into digital amounts and to determine therefrom the ACTUAL values I and evaluate these ACTUAL values I by the algorithm, the computing unit R may contain at least one A/D converter, which converts analog output signals of one or more sensors S into digital ACTUAL values I.

We claim:

1. A process for controlling and adjusting a control unit of a vehicle-occupant protection system by triggering the protection system if an accident is sufficiently serious, wherein the control unit includes:

at least one sensor for supplying at least one sensor signal during the accident, and a computing unit for computing ACTUAL values characterizing a course of the accident on the basis of the sensor signal, for independently and continuously redefining a time-variable triggering threshold value, the triggering threshold value being at least indirectly dependent on the momentary sensor signal value of the sensor signal during the course of the accident, the process comprising the steps of:

a) computing with the computing unit the triggering threshold value on the basis of the progression of at least one ACTUAL value, which is determined by means of an average deceleration value, b) increasing the triggering threshold value with an increasing amount of the average deceleration;

c) comparing with the computing unit the triggering threshold value with another ACTUAL value; and d) triggering the protection system if the other ACTUAL value exceeds the triggering threshold value.

2. The process according to claim 1, which comprises establishing a plurality of different ACTUAL values with the computing unit.

3. The process according to claim 1, which comprises establishing at least one ACTUAL value corresponding to a deceleration and an ACTUAL value of a travel/time corresponding to a loss in speed, with the computing unit.

4. The process according to claim 1, which comprises:
supplying a deceleration signal from the at least one sensor in the form of a crash sensor in the event of an accident; performing at least one time integration of the deceleration signal from a starting time with the computing unit during the accident, for determining the at least one ACTUAL value; and comparing the ACTUAL value determined through the integration with a time-variable triggering threshold value in the computing unit.

5. The process according to claim 4, which comprises performing the time integration of the deceleration signal for determining an ACTUAL loss in speed.

6. The process according to claim 4, which comprises performing a time integration of the deceleration signal with the computing unit over a short time duration in comparison with the duration of the deceleration signal, for continually determining a current partial loss in speed, as the current speed value, during the accident.

7. The process according to claim 6, which comprises performing the time integration of the deceleration signal for only 5 msec, and beginning the time duration in advanced accident phases after the starting time.

8. The process according to claim 4, which comprises performing a time integration of the deceleration signal over the entire duration thus far as the integration with the computing unit, commencing from the starting time, for continually determining a total current loss in speed occurring since the starting time by approximation during the accident.

9. The process according to claim 8, which comprises performing the time integration of the deceleration signal with the computing unit exclusively.

10. The process according to claim 8, which comprises performing the time integration of the deceleration signal with the computing unit additionally.

11. The process according to claim 8, which comprises making the current triggering threshold value dependent on at least one stored past value having been determined by the computing unit during previous phases of the accident, and mathematically defining and making the triggering threshold value dependent on at least a first component depending on the amount of a current deceleration average value, and a second component depending on stored amounts of past values.

12. The process according to claim 11, which comprises respectively representing the first and second component by an element of a mathematical difference, in which the first component forms a subtrahend and contains a weighted amount of the current deceleration average value, and the second component forms a minuend and contains a weighted difference between the amounts of the respective past values.

13. The process according to claim 12, which comprises multiplying the first component by a first weighting factor, and multiplying the second component by a second weighting factor.

14. The process according to claim 1, which comprises also making the current triggering threshold value dependent on at least one stored past value amount having been determined by the computing unit during previous phases of the accident.

15. The process according to claim 14, which comprises using previously determined triggering threshold values as current values for those times for which at least one of the last minimum and the maximum preceding the last minimum of the progression of the respectively determined at least partial loss in speed.

16. The process according to claim 15, which comprises using a difference between a sum of the determined partial loss in speed during the last minimum and during the maximum preceding the last minimum as the past value, wherein the triggering threshold value becomes respectively one of a greater and smaller threshold value according to a rising and a falling difference.

17. The process according to claim 16, which comprises dividing the difference by an amount of the determined loss in speed for the respective maximum.

18. The process according to claim 17, which comprises dividing the difference by the amount of the determined loss in speed for the respective minimum.

19. The process according to claim 16, which comprises dividing the difference by the amount of a time period between the respective minimum and respective maximum.

20. The process according to claim 1, which comprises setting the triggering threshold value to a constant value at predetermined times.

21. The process according to claim 1, which comprises defining the triggering threshold value with the computing unit by a division of a currently determined, at least partial loss in speed through a time duration and consequently by determination of a current deceleration average value.

22. A method for controlling and adjusting a protection system for occupants of a vehicle if a crash is sufficiently serious, the vehicle including:
at least one sensor supplying sensor signals during an accident; and
a computing unit establishing at least one ACTUAL value characterizing a progression of the accident on the basis of the sensor signals, during the accident, for automatically and continuously redefining a time-variable triggering threshold value, the threshold value being at least indirectly dependent on changes in the sensor signals during the course of the accident, the method which comprises the steps of:
 a) determining differences between the ACTUAL value and the triggering threshold value assigned to the ACTUAL value;
 b) defining the triggering threshold value on the basis of the progression of the ACTUAL value, and
 c) increasing the triggering threshold value with an amount equal to an actual increase in the average deceleration in a fluctuating manner during an accident phase, in dependence on an instantaneous value of the ACTUAL value, if decelerations occur during the accident phase, and
 d) triggering the protection system if the deceleration exceeds the threshold value.

23. The method according to claim 22, including establishing with said computing unit a plurality of different ACTUAL values.

24. The method according to claim 22, including establishing with said computing unit at least one of an ACTUAL value corresponding to a deceleration and an ACTUAL value of a travel/time corresponding to a loss in speed.

25. The method according to claim 22, including providing in the protective system an air bag system.

\* \* \* \* \*